United States Patent
Heinzer

[11] 3,910,807
[45] Oct. 7, 1975

[54] SEAM WELDING APPARATUS

[75] Inventor: Hans Heinzer, Beringen, Switzerland

[73] Assignee: SIG Schweizerische Industrie-Gesellschaft, Heuhausen am Rheinfall, Switzerland

[22] Filed: May 2, 1974

[21] Appl. No.: 466,495

[30] Foreign Application Priority Data
May 2, 1973  Switzerland.......... 6230/73

[52] U.S. Cl............................ 156/380; 156/499
[51] Int. Cl.² ............................ B32B 19/02
[58] Field of Search............. 156/272, 380, 499

[56] References Cited
UNITED STATES PATENTS

| | | | |
|---|---|---|---|
| 2,606,850 | 8/1952 | Piazze | 156/499 |
| 2,682,910 | 7/1954 | Piazze | 156/272 |
| 2,691,474 | 10/1954 | Olson | 156/499 |
| 2,749,020 | 6/1956 | Baxter | 156/499 |
| 2,979,113 | 4/1961 | Stageberg | 156/499 |
| 3,326,735 | 6/1967 | Beason, Jr. | 156/272 |
| 3,413,175 | 11/1968 | Rochla | 156/499 |
| 3,461,017 | 8/1969 | Fecher et al. | 156/380 |

*Primary Examiner*—Douglas J. Drummond
*Attorney, Agent, or Firm*—Spencer & Kaye

[57] ABSTRACT

For forming a welded seam between at least two face-to-face arranged foils made of a synthetic material, the foils are held firmly in cooperating work faces of a pair of clamping shoes. A heating bar is brought into the vicinity of the work faces to fuse, by radiating heat, a marginal zone of the foils projecting beyond the work faces of the clamping shoes. At least one of the clamping shoes is provided with channels for a coolant which solidifies the molten edge welt into a welded seam.

8 Claims, 7 Drawing Figures

3,910,807

SEAM WELDING APPARATUS

BACKGROUND OF THE INVENTION

This invention relates to a method and an apparatus for making a welded seam between at least two synthetic foils, particularly polyethylene foils and is generally of the type wherein the foils held firmly between two clamping shoes are heated and at least one of the clamping shoes is cooled. In known devices it is the clamping shoes, or at least one of them, which serve for communicating to the foils the heat necessary for forming the welded seam. In this manner, the seam is formed as a result of the combined effect of heat and pressure. The degree at which the foil material softens or flows and thus the temperature to be applied depends upon the properties of the synthetic substance of which the foils are made. It is a disadvantage of such an arrangement that, since certain plastics, particularly polyethylenes, obtain, during heating, relatively strong adhesive properties, their adherence to the clamping shoes cannot be prevented. This results, upon opening of the clamping shoes, in the destruction of the fresh weld. To prevent such an occurrence, it has been necessary to very accurately dose the heat, for example, by means of pulsating transmission of electric energy. Pulse welding, however, requires very expensive equipment as well as skilled and highly attentive labor; yet, the results are not always satisfactory, especially in case of relatively thin polyethylene foils. This disadvantage of known processes could not entirely be eliminated even by providing a protective foil (made, for example, of polytetrafluorethylene) on the pulsatingly heated component (for example, a heater ribbon) of a relatively complex welding shoe for preventing the heated component from directly contacting the foil to be sealed.

SUMMARY OF THE INVENTION

It is an object of the invention to provide an improved method and apparatus of the afore-outlined type from which the discussed disadvantages are securely eliminated.

This and other objects to become apparent as the specification progresses, are accomplished by the inventive method, according to which, briefly stated, a heating bar is moved to the vicinity of a marginal foil zone projecting beyond the clamping shoes which firmly hold the foils together, for effecting a fusion of the zone by the heat transmitted thereto from the heating bar by heat radiation. As a result, the molten material runs together to form an edge welt. The edge welt is cooled for causing its solidification into a welded seam.

The apparatus according to the invention has a heating bar which may be brought to the marginal zones of the plastic foils which are firmly held between the clamping shoes. At least one of the clamping shoes is provided with internal channels for a coolant.

DESCRIPTION OF THE PREFERRED EMBODIMENT

The apparatus illustrated in the Figures may form part of a polyethylene bag making machine and serves to provide a hose-like product of generally rectangular cross section with a bottom seam that unites transversely the sheet material. Such a hose-like product may be made with a machine described for example in U.S. Pat. No. 3,774,509.

Figure 1:
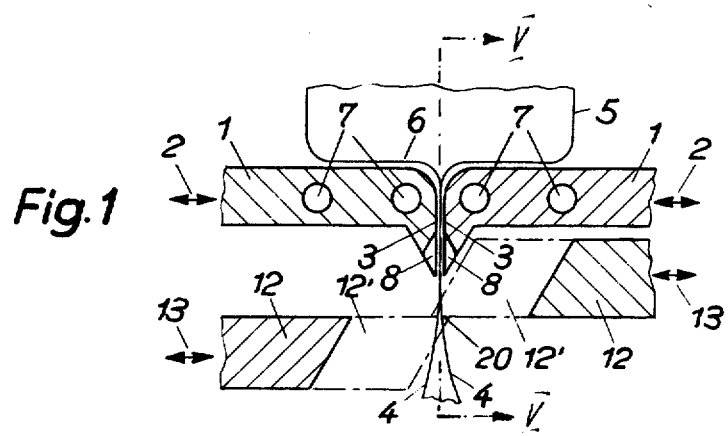
FIGS. 1 to 4 are fragmentary side elevational sectional views of a preferred embodiment showing the same in four different positions during operation.

Turning now to FIG. 1, the apparatus shown therein has two clamping shoes 1 of simple, identical configuration which are movable toward and away from one another in the direction of the double-headed arrows 2. The clamping shoes 1 each have work faces 3 which are oriented towards one another and which, in the position illustrated in FIG. 1, firmly hold between them two polyethylene sheets or foils 4. The foils 4 constitute two face-to-face arranged opposite sides of a polyethylene hose 5 which has been deformed in a known manner by the clamping shoes 1 for the purpose of forming a bag bottom 6.

Figure 5:
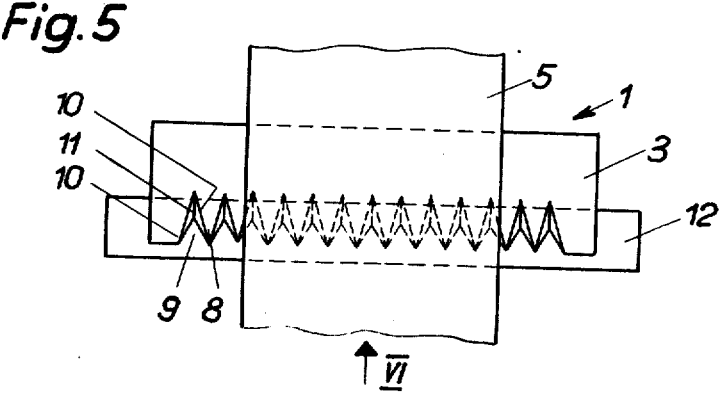
FIG. 5 is a front elevational view of the same embodiment taken in the direction of line V—V of FIG. 1.
Figure 6:
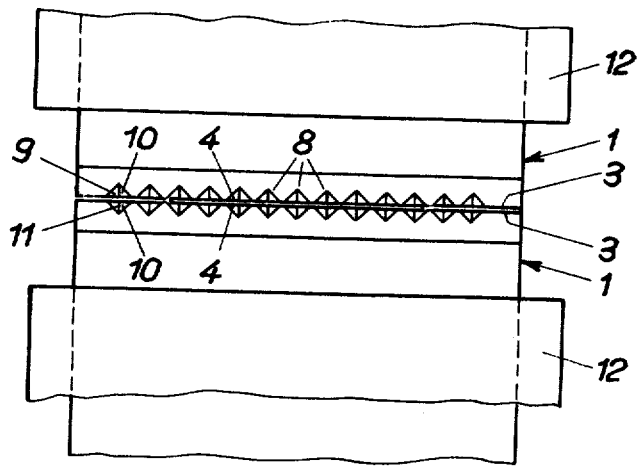
FIG. 6 is a bottom plan view of the same embodiment taken in the direction of arrow VI of FIG. 5.

The clamping shoes 1 are further provided with internal channels 7 through which a coolant flows. Each clamping shoe 1 also has a row of teeth 8 which form the lower marginal zone of the planar work face 3. As it may be best observed in FIGS. 5 and 6, the clearance 9 between any two adjacent teeth 8 is bounded by symmetrical, lateral tooth sides 10 which intersect along a straight line 11. The latter is inclined with respect to the frontal face 3.

Beneath the clamping shoes 1 there are arranged two knives 12 which may be moved back and forth in the direction of the double-headed arrow 13 (FIG. 1) and which cooperate for severing the foils 4.

Figure 2:
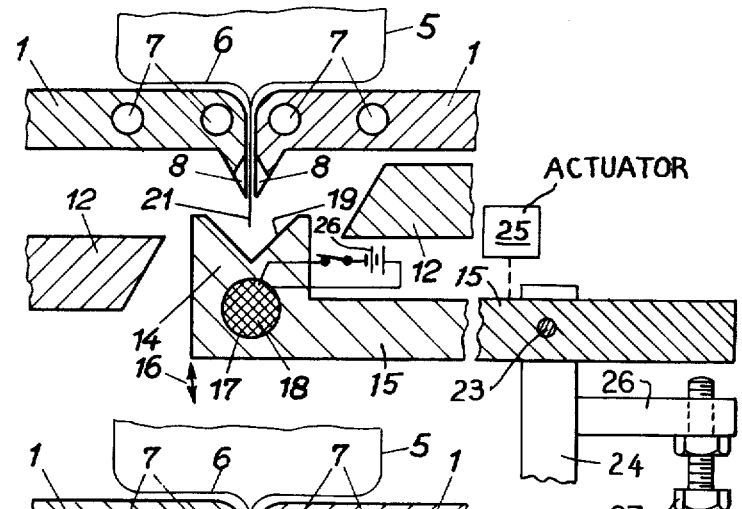

Turning now to FIG. 2, according to the invention the apparatus includes a heating bar 14 which is carried at the end of a holder arm 15. The latter is pivotally attached at 23 to a stationary support 24. The arm 15 and thus the heating bar 14 may be swung up and down as a unit through an angle of approximately 90° in the direction of the double-headed arrow 16. The movement of the holder arm 15 may be effected by a conventional, for example, solenoid-operated actuator mechnanism only symbolically shown at 25. Below the holder arm 15 there is mounted a stop device formed of a bracket arm 26 and a set screw 27 for adjustably limiting the clockwise excursion of the holder arm 15. In this manner the closest position of the heating bar 14 with respect to the clamping shoes 1 is determined.

Figure 3:
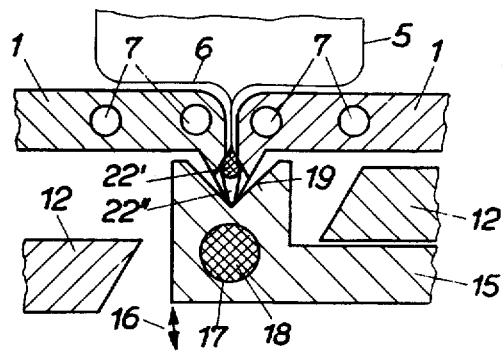

In a longitudinal bore 17 of the heating bar 14 there is positioned an electric heating rod 18 connected to a current source 26 in a conventional manner, for providing, during operation, a continuous, single-level heating (as opposed to pulsating heating) of the heating bar 14. The heating bar 14 further has a groove 19 of V-shaped section which, in its operational position as illustrated in FIGS. 2 and 3, is disposed adjacent to, and extends along the teeth 8.

In the description that follows, the operation of the above-described apparatus will be set forth.

Subsequent to clamping the foils 4 between the clamping shoes 1, they are severed at 20, at a short distance from the teeth 8, by virtue of the inward motion of the knives 12 into the position 12' (FIG. 1). As a result, the foils 4 have a narrow marginal zone 21 (FIG. 2) of approximately 2 millimeters projecting beyond the teeth 8 of the clamping shoes 1. After the knives 12 are withdrawn into their position of rest, the holder 15 is pivoted upwardly, first into the position shown in FIG. 2 and then further into the position shown in FIG. 3 in which the points of the teeth 8, by virtue of their abutment against the base of the groove 19 of the heating bar 14, prevent a further upward pivotal motion of the holder 15 towards the clamping shoes 1.

Figure 4:
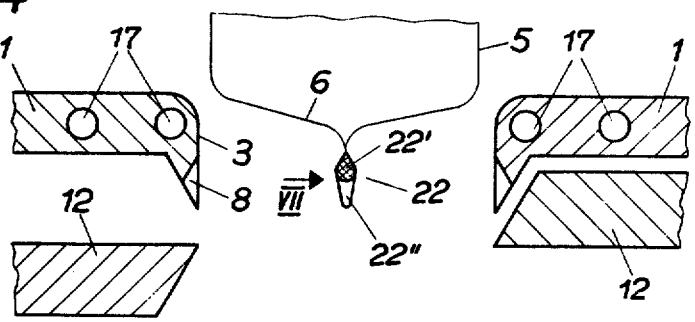
Figure 7:
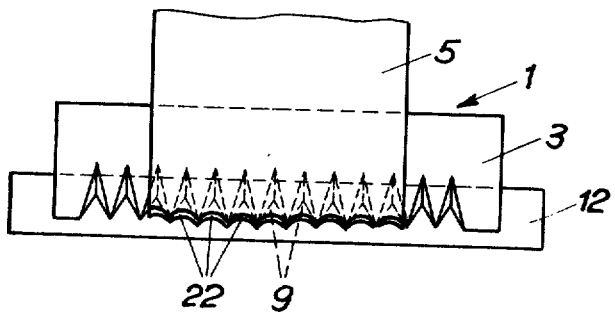
FIG. 7 is a front elevational view of the same embodiment taken in the direction of arrow VII of FIG. 4.

The heat radiating from the heating bar 14 and directed by the side walls of the groove 19 onto the foils 4 and onto the teeth 8 effect very rapidly a melting of the projecting marginal zones 21. The material in these zones is, by virtue of the surface tension of the molten mass, pulled upwardly and runs together to form a welt which, as a consequence of the cooling of the clamping shoes 1, solidifies to constitute the desired welded seam 22 already at a small distance beyond the points of the teeth 8. The welded seam 22 does not extend linearly but has a wavy, undulating shape as shown in FIG. 7. The reason for this phenomenon is that in the clearances 9 between the teeth, the molten polyethylene is pulled higher up until it solidifies, because the cooled work faces 3 are the most effective in their cooling effect at the points of the teeth 8. In FIGS. 3 and 4 there is shown at 22' a section through the welded seam at the highest point of a wave and at 22'' there is shown a visible portion of this wave up to the successive lowermost point.

As the heating bar 14 is approaching the teeth 8, care has to be taken that it does not touch the marginal zone 21 of the foils 4 because, should such touching occur, the molten material would travel upwardly only in part and would, in part, stick to the heating bar 14. This protective measure can be accomplished in practice with ease. In case the heating bar 14 has a high enough temperature and provisions are made for a good cooling, the welded seam is formed with great reliability and has a superior quality without the necessity of regulating the temperature to an accurately determined value. Even at the moment when the bottom of the groove 19 abuts the teeth 8, the heating bar 14 does not contact the molten material because the latter, by that time, has already receded somewhat from the points of the teeth 8.

The formation of welt occurs very rapidly and may be effected with ease during a single operational step of the known bag making machine. With the apparatus according to the invention it is feasible to provide a top seam or a lateral seam in the same manner as, and in addition to, the bottom seam. For this purpose a second apparatus of the above-described structure is provided which has a heating bar so oriented that it can be brought into the zone where a top seam or a lateral seam is to be formed. Although the above-described process is particularly well adapted to form a bottom weld and/or a top weld in the manufacture of polyethylene bags, it should in no way be considered as limited to such a use.

It is further within the scope of the invention to omit the teeth 8 so that the marginal zones 21 of the foils 4 are then bounded at the top by straight edges of the work faces 3. In this manner a straight weld instead of an undulating weld is obtained. It is to be noted, however, that the undulating welded seam 22 has the advantage that it has a greater length, and as a result, it more strongly interconnects the foils 4 with one another than would a linear seam of the same weld thickness. In case the clamping shoes 1 do not have teeth which, as noted before, simultaneously serve as abutments for the heating bar 14, it is advisable to provide a preferably adjustable abutment on the clamping shoes 1 in order to prevent the heating bar 14 from contacting the marginal zone 21 of the foils 4.

It is further to be noted that between the clamping shoes 1 there may be held more than two foils 4 and, subsequent to their severance, the thus formed edges may be welded to one another. A simultaneous severance of the foils is not a requirement if the edges of two or more foils are carefully aligned prior to clamping. Further, the heating bar may be heated by means other than an electrical heater and may also be brought into its working position by a linear shift rather than by a swinging motion. The heating of the heating bar is continuous so that the complex provisions necessary for an electrical pulse control can be omitted altogether.

It will be understood that the above description of the present invention is susceptible to various modifications, changes and adaptations, and the same are intended to be comprehended within the meaning and range of equivalents of the apprended claims.

I claim:

1. An apparatus for forming a welded seam between at least two foils made of a synthetic material, the apparatus including a pair of clamping shoes movable towards and away from one another and including cooperating work faces for firmly holding therebetween the foils in a face-to-face relationship, wherein the improvement comprises a heating bar having an operative position adjacent said work faces for fusing, by radiating heat, a marginal zone of the foils projecting beyond said work faces of said clamping shoes, said heating bar further having an inoperative position remote from said work faces; means for moving said heating bar from one of its positions into the other; and means defining channel means in at least one of said clamping shoes for accommodating a coolant; each said work face being planar and having an edge formed of a tooth row constituted by a plurality of spaced teeth, the two tooth rows being in a parallel-extending, adjoining relationship when the clamping shoes are in a clamping position; the space between any two adjacent teeth of one tooth row being defined by two lateral tooth walls intersecting in a straight edge, said straight edge being inclined with respect to the work face of the same clamping shoe.

2. An apparatus as defined in claim 1, further comprising
   d. a heater rod contained in said heating bar; and
   e. electric means connected to said heater rod for energizing said heater rod.

3. An apparatus as defined in claim 1, further comprising
   d. a holder carrying said heating bar; and
   e. means for pivotally supporting said holder.

4. An apparatus as defined in claim 1, including means defining a groove in said heating bar; said groove, when said heating bar is in its operative position, is oriented towards said work faces for directing the heat radiating from said heating bar to the marginal foil zone projecting beyond said clamping shoes.

5. An apparatus as defined in claim 4, wherein said groove is V-shaped in section.

6. An apparatus as defined in claim 1, including means defining a groove in said heating bar, said groove having a base; said groove, when said heating bar is in its operative position, is oriented towards said work faces for directing the heat radiating from said heating bar to the marginal foil zone projecting beyond said clamping shoes; said teeth abutting said base of said groove in the operative position of said heating bar for determining the closest position of said heating bar with respect to said work faces of said clamping shoes.

7. An apparatus as defined in claim 1, including a stop means for abutting said heating bar to determine the closest position of the latter with respect to said work faces of said clamping shoes.

8. An apparatus as defined in claim 7, wherein said stop means is adjustable.

* * * * *